No. 848,766. PATENTED APR. 2, 1907.
A. E. PHELON.
TRANSMISSION GEAR.
APPLICATION FILED APR. 30, 1906.
2 SHEETS—SHEET 1.
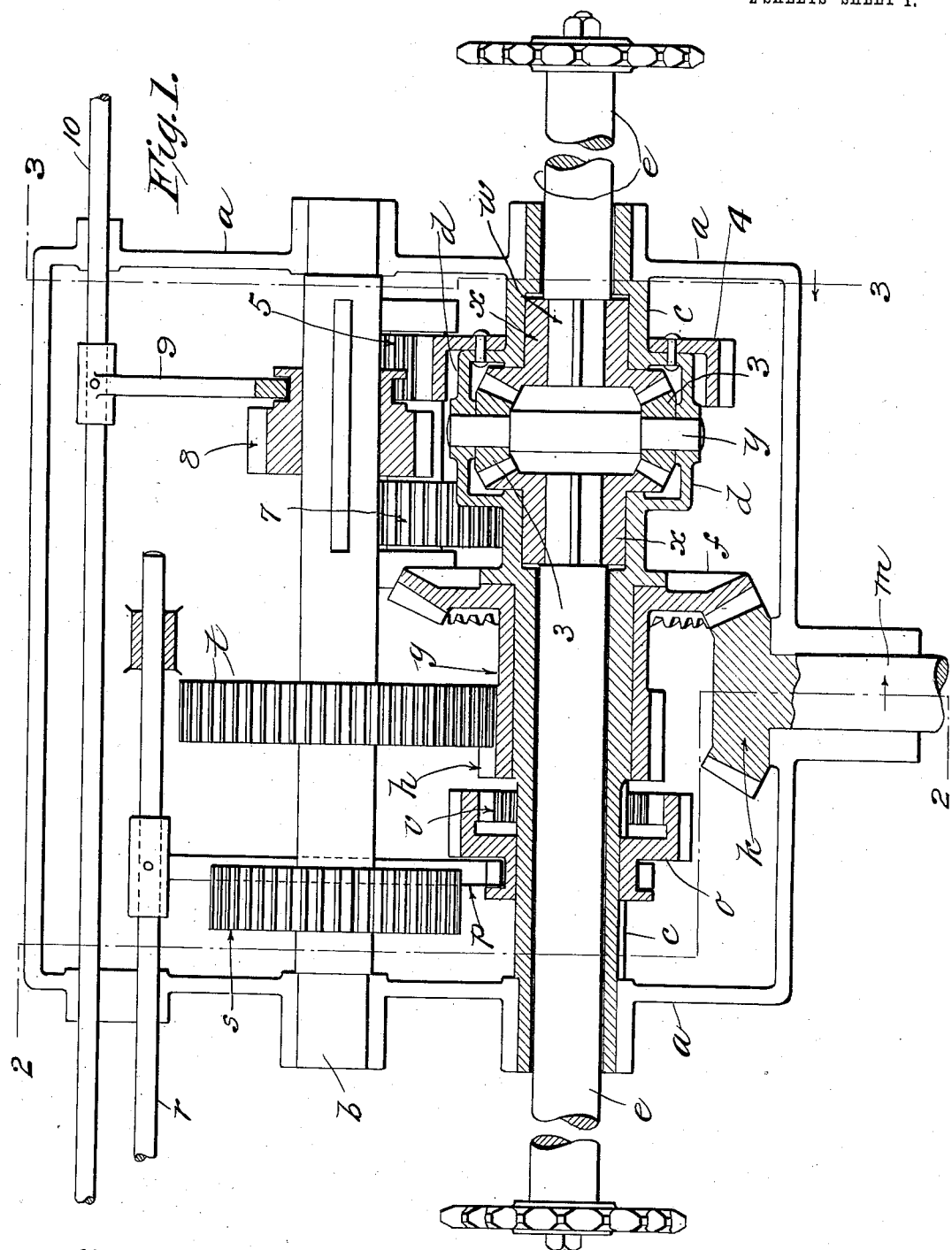

No. 848,766. PATENTED APR. 2, 1907.
A. E. PHELON.
TRANSMISSION GEAR.
APPLICATION FILED APR. 30, 1906.
2 SHEETS—SHEET 2.
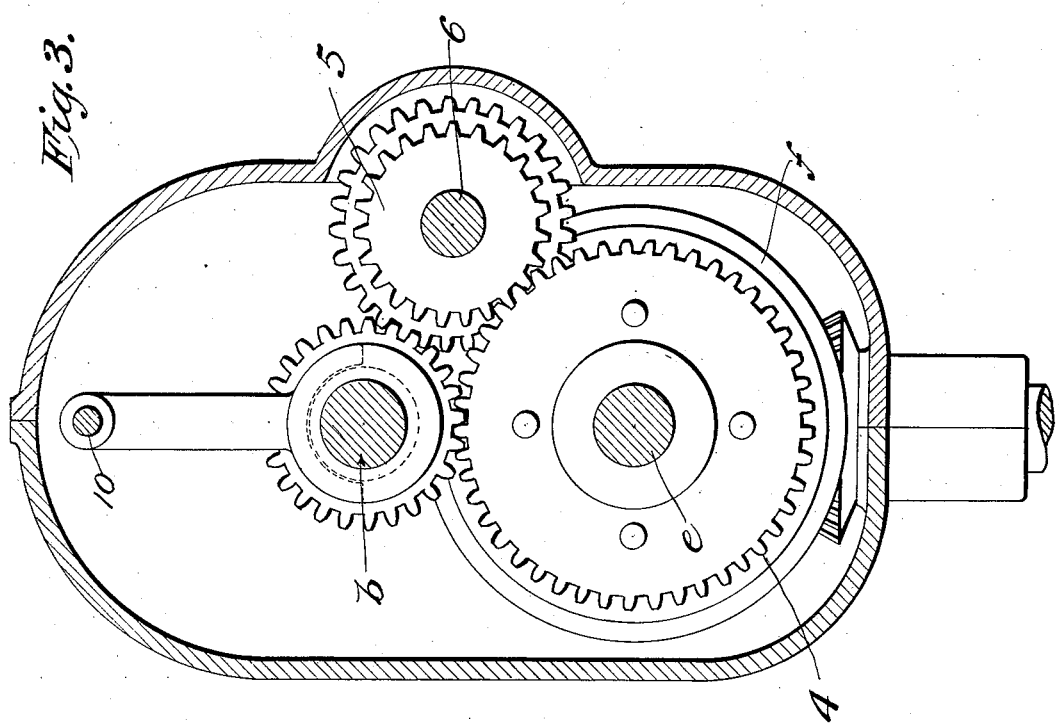
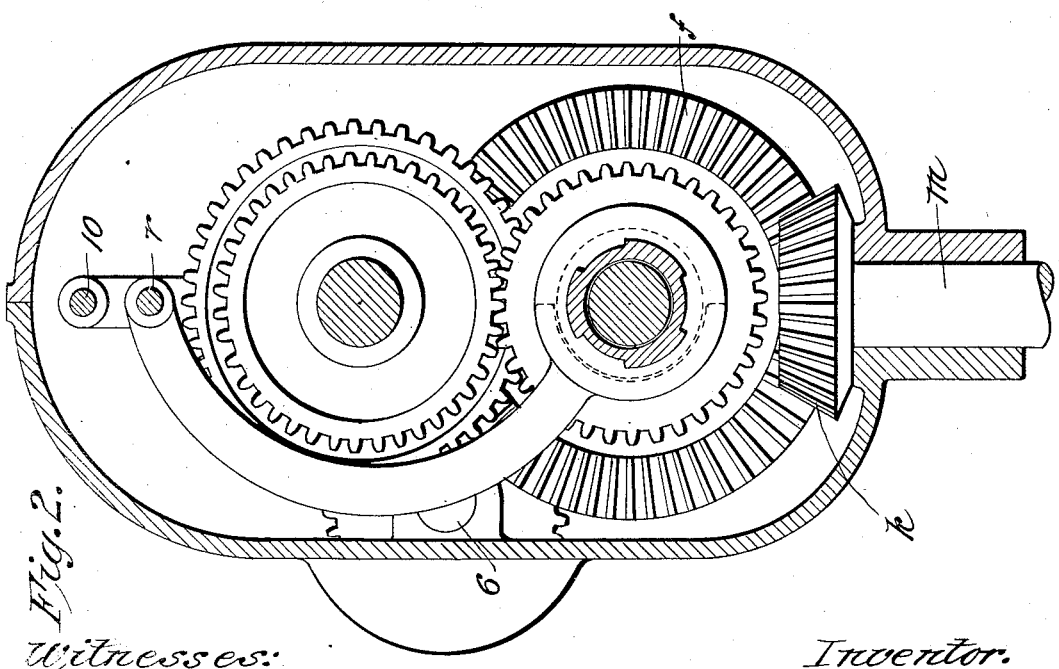
Witnesses:
H. L. Sprague
E. W. Seaholm
Inventor.
Arthur E. Phelon.
by Chapin & Co.
Attorneys.

UNITED STATES PATENT OFFICE.

ARTHUR E. PHELON, OF SPRINGFIELD, MASSACHUSETTS.

TRANSMISSION-GEAR.

No. 848,766.        Specification of Letters Patent.        Patented April 2, 1907.

Application filed April 30, 1906. Serial No. 314,343.

*To all whom it may concern:*

Be it known that I, ARTHUR E. PHELON, a citizen of the United States of America, residing at Springfield, in the county of Hampden and State of Massachusetts, have invented new and useful Improvements in Transmission-Gears, of which the following is a specification.

This invention relates to variable-speed transmission mechanism, the object thereof being to provide an improved construction of that class of these mechanisms in which the differential mechanism is embodied, the invention consisting in the mechanism to be fully hereinafter described, and clearly summarized in the claims appended thereto, the invention being clearly illustrated in the accompanying drawings, in which—

Figure 1 is a plan view, partly in section, of a variable-speed mechanism in which the invention is embodied in its preferred form. Fig. 2 is a cross-sectional view on line 2 2, Fig. 1, looking in the direction of the arrow, showing the relation of the gears on the two shafts of the transmission device in this plane and the relation of one of the clutches to one of the gears on said shaft. Fig. 3 is a similar view in the plane of line 3 3, Fig. 1, looking in the direction of the arrow, this view showing more clearly the relation of the intermediate reversing-gear to the two shafts of the transmission mechanism.

Referring now to the drawings, $a$ represents a casing which incloses the transmission mechanism, in the opposite walls of which the shaft $b$ has a bearing at each end. This is practically the counter-shaft. Parallel with this shaft the sleeve $c$ also has a bearing in the casing, a part $d$ of this sleeve constituting a housing for the differential gear. This is of a well-known design and will be briefly described farther on. In the sleeve $c$ is located the two-part driven shaft $e$. In the drawings this is represented as a sprocket-shaft of a self-propelled chain-driven vehicle.

Mounted loosely on the sleeve $c$ is the bevel-gear $f$, having a relatively long hub $g$, on the end of which is cut a gear $h$. This bevel-gear $f$ is always in mesh with the bevel-gear $k$ on the end of the driving-shaft $m$ which enters the casing at right angles to the driven shaft. That part of the sleeve on which the gear $f$ is mounted is of somewhat larger diameter than that immediately at the left-hand side thereof in Fig. 1, said last-named portion of the shaft being channeled, as shown in Fig. 2, to receive the hub of a sliding gear $o$, which is movable on this portion of the shaft by means of a fork $p$, actuated by a sliding rod $r$.

On the shaft $b$ two gears of different diameters are secured, one of them, $s$, in position to be engaged by the gear $o$ and the other, $t$, being constantly in mesh with the gear $h$ on the hub of the beveled gear $f$. It follows, therefore, that as the latter is constantly rotated by its connection with the driving-shaft it will impart constant motion to the shaft $b$ through the gear $t$, and therefore when the gear $o$ is slid along to the left into mesh with the gear $s$ the sleeve $c$ will be rotated and the speed of its rotation will be in proportion to the relative diameters of the gears through which rotative motion is imparted thereto—that is, the gear $h$ driving onto the gear $t$ and the gear $s$ meshing with the gear $o$. This gives the second speed in advance.

On that end of the gear $o$ contiguous to the gear $h$ an internal gear $v$ is cut to mesh with said gear $h$, and if the gear $o$, actuated by its clutch-lever, is slid to the right into mesh with this gear it locks the gear $f$ to the sleeve $c$, which gives a direct drive in advance at the highest speed, the rotation of the driven shaft $e$ in either case taking place through the differential gears, as follows: The driven shaft $e$ is a two-piece shaft, the contiguous ends thereof being, as usual, within the differential gear-case, these ends being squared, as at $w$, to receive the hubs of oppositely-facing beveled gears $x$. On opposite ends of the stud-shaft $y$, passing through the casing, are two beveled pinions 3, each engaging the beveled gears $x$ in the usual manner. This construction being a well-known type of differential gear constitutes no part of the invention except as used in combination with other novel features. When, therefore, the sleeve $c$ is rotated, the two parts of the driven shaft $e$ will through this differential gear rotate as one shaft.

On the gear-casing $d$ is bolted or otherwise secured the gear 4, which is constantly in mesh with a gear 5, rotatably mounted on a short shaft 6, (see Fig. 3,) which is located back of and parallel with the shaft $b$. On this same shaft 6 is fixed a larger gear 7, with which a sliding gear 8 on the shaft $b$ may engage. This last-named gear is actuated by a fork 9 and has a spline and groove or other slidable and rotative connection with the shaft $b$.

To attain the lowest or third speed in advance for the driven shaft $e$, the gear 8 is thrown to the right of its position shown in Fig. 1 directly into mesh with the gear 4. To attain the reverse speed, which also always is a relatively slow speed, the gear 8 is thrown to the left of its position shown in Fig. 1 into mesh with gear 7, which thereupon acts as an intermediate between the gear 8 and the gear 5, which drives the sleeve $c$, and therefore the latter will be rotated in a direction reverse to that which is attained by sliding the gear 8 directly into mesh with the gear 4 on said sleeve.

Having thus described my invention, what I claim, and desire to secure by Letters Patent of the United States, is—

1. A variable-speed mechanism comprising a rotatable sleeve suitably supported, a portion of which constitutes a differential-gear case, a counter-shaft, a sliding gear on the sleeve and a second sliding gear on the counter-shaft; a two-part shaft in the sleeve, and a differential-gear mechanism in the sleeve with which the ends of the driven shaft engage and constituting a connection between the sleeve and shaft; a fixed gear on the counter-shaft with which the sliding gear on the sleeve meshes, and a fixed gear on the sleeve with which the sliding gear on the counter-shaft meshes, and a loose gear constantly rotating on the sleeve, with which the sliding gear on the sleeve may engage to rotate the sleeve by direct drive, and an intermediate gear between the sliding gear on the counter-shaft and the fixed gear on the sleeve whereby the latter may be reversely rotated by the engagement of the sliding gear with said intermediate.

2. A variable-speed mechanism comprising an inclosing casing, a sleeve rotatably mounted therein, a portion of which constitutes a differential-gear case, differential-gear mechanism in the latter, and a two-part driven shaft in the sleeve operatively connected to the differential; a counter-shaft rotatably mounted in the casing parallel with the said sleeve, a loose gear on the latter, and a fixed gear on the counter-shaft with which the loose gear is in mesh, and suitable means to impart constant rotation to the loose gear, a sliding gear on the sleeve nonrotatable thereon, and a second fixed gear on the counter-shaft, said sliding gear being movable into meshing engagement with the loose gear to rotate the sleeve at one speed or into mesh with said second fixed gear on the counter-shaft to rotate the sleeve at a different rate of speed in the same direction, a sliding gear on the counter-shaft, and a gear secured to the sleeve, and means to move this sliding gear into mesh with the gear fixed to the sleeve to rotate the latter.

ARTHUR E. PHELON.

Witnesses:
   Israel Newton,
   F. I. Wilson.